United States Patent Office 3,706,781
Patented Dec. 19, 1972

3,706,781
1,2-DIHYDROPHENANTHRENES
Michael Marx, Sunnyvale, and John H. Fried, Palo Alto, Calif., assignors to Syntex Corporation, Panama, Panama
No Drawing. Filed Dec. 9, 1969, Ser. No. 883,643
Int. Cl. C07c *69/76*
U.S. Cl. 260—468.5                                   6 Claims

ABSTRACT OF THE DISCLOSURE

New compounds of the 1,2-dihydrophenanthrene class, useful as estrogenic and anti-fertility agents, and methods for their preparation 1α-ethyl-2α-carboxy-2β-methyl-7-methoxy-1,2-dihydrophenanthrene is exemplified as illustrative of the class.

---

The present invention relates to novel 1,2-dihydrophenanthrene compounds and derivatives thereof and processes and intermediates useful for their preparation. Specifically, the present invention pertains to novel and useful cis and trans racemates of 1,2-dihydrophenanthrene compounds which are represented by the following Formula A:

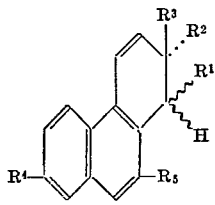

In the foregoing and succeeding formulas, $R^1$ is methyl or ethyl;
$R^2$ is carboxy and the alkali metal salts thereof, carb-(lower) alkyloxy, formyl, or hydroxymethyl and the conventional hydrolyzable esters and ethers thereof;
$R^3$ is methyl or ethyl;
$R^4$ is lower alkyloxy, hydroxy or the conventional hydrolyzable esters and ethers thereof; and
$R^5$ is hydrogen or methyl.

In the present specification and claims, the term "lower alkyloxy" denotes the group —OAlkyl, "Alkyl" being a straight or branched chain saturated hydrocarbon group containing from 1 to 6 carbon atoms, inclusive, such as methyl, ethyl, n-propyl, isopropyl, n-butyl, isobutyl, t-butyl, pentyl, amyl, hexyl, and the like. The expression "conventional hydrolyzable esters and ethers," as used herein, refers to those physiologically acceptable hydrolyzable ester groups and labile ether groups conventionally employed in the pharmaceutical art such as acetate, propionate butyrate, trimethylacetate, valerate, methylethylacetate, caproate, t-butylacetate, 3-methylpentanoate, enanthate, caprylate, triethylacetate, pelargonate, decanoate, undecanoate, benzoate, phenylacetate, diphenylacetate, cyclopentylpropionate, methoxyacetate, aminoacetate, diethylaminoacetate, trichloracetate, β-chloropropinate, bicyclo[2.2.2]octane - 1 - carboxylate, adamantoate, dihydrogen phosphate, dibenzyl phosphate, sodium ethyl phosphate, sodium sulfate, sulfate, tetrahydropyran-2-yl ether, tetrahydrofuran-2-yl ether, 4-methoxytetrahydropyran-4-yl ether, cyclopentylether, and the like. The expression "carboxy" denotes the —CO₂H group and "formyl" the —CHO group.

In the present specification and claims, the wavy lines ⁓) at the C–1 position of the phenanthrene nucleus indicates the configuration alpha or beta or mixtures thereof. Thus, the compounds of the present invention can exist in two d and two 1 forms, that is, d-cis, d-trans, l-cis, and l-trans. In addition, two racemates are possible, that is, dl-cis and dl-trans. While each or mixtures are included within the scope hereof, the dl-cis racemate is preferred. Similarly, the wavy line (⁓) at the C–4 position denotes the configuration alpha or beta mixtures thereof since each of C–4α and C–4β halo isomers are generated by and included in the process hereof.

For the purpose of the present invention, the conventional numbering of the various carbon positions on the phenanthrene nucleus is employed. For example, as used herein, the position of the $R^5$ substituent is designated and defined as the C–10 ring position.

The compounds of the present invention possess estrogenic and anti-fertility activity. They are accordingly useful in replacement therapy for estrogen deficiencies and in the control and regulation of fertility and in the management of various menstrual disorders and are employed in accordance with these uses in the same manner as known estrogenic and anti-fertility agents. Thus, they can be administered in conjunction with one or more pharmaceutically non-toxic excipients, whether orally or parenterally, and at dosage levels appropriate for the condition being treated or effect desired, the most favorable dosage being determinable by one of ordinary skill in the art taking into consideration the particular condition being treated and the observed response to treatment. Useful pharmaceutical excipients, solid or liquid, include water, polyalkylene glycols, vegetable oils, lactose, talc, magnesium stearate, gelatin, starches, flavoring agents and the like. In general, the compounds of the present invention are used in the adopted manner customary with compounds having like utility.

The compounds of the present invention are prepared in accordance with the following reaction sequence of partial formulas:

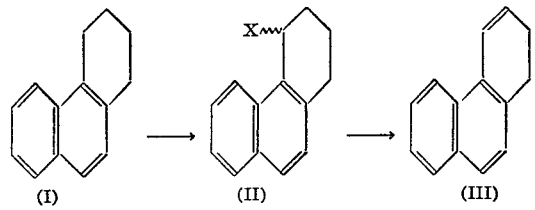

wherein X is bromo or chloro.

With reference to the reaction scheme outlined above, the pentaene starting material (I) is halogenated with a brominating or chlorinating agent to obtain the 4-bromo- or chloropentaene intermediate compound (II). The intermediate (II) is dehydrohalogenated wtih a dehydrohalogenating agent to obtain the final product hexaene (III).

The first halogenation involves reacting a 1,2,3,4-tetrahydrophenanthrene compound together with bromine, chlorine, N-bromosuccinimide, N-chlorosuccinimide, N-bromoacetamide, N-chloroacetamide, dibromodiphenylhydantoin, or other agents capable of effecting benzylic halogenation, in an organic liquid reaction medium. The reaction is conducted in the presence of light, either natural or that derived from a source, suitably an ordinary incandescent lamp. Suitable organic liquid reaction media include those provided by the halogenated methanes, such as carbon tetrachloride, chloroform, and methylene chloride, alone or optionally in the presence of other organic solvents such as benzene, toluene, dioxane, tetrahydrofuran, and so forth. The reaction is conducted at temperatures ranging from about 40° C. to about 100° C. and, preferably, from 60 to 85° C. and for a period of time sufficient to complete the reaction ranging from about 10 minutes to about 90 minutes or more.

The second step dehydrohalogenation involves reacting the 4-bromo or -chlorotetrahydrophenanthrene compound together with a cyclic amine such as collidine, lutidine, pyridine, diazabicyclononane, and the like or with dimethylformamide, used either alone or in the presence of lithium salts, or with a hindered alkyl amine, for example diisopropylamine. This reaction is optionally conducted in organic liquid reaction media including those listed hereinabove which are useful in the halogenation step. The reaction is conducted at temperatures ranging from about 0° C. to about 100° C. preferably from 25 to 65° C. and for a period of time sufficient to complete the reaction ranging from about 3 minutes to about one hour or more.

In carrying out these reactions, the reactants are contacted and maintained together in any convenient order or fashion. They are then maintained within or about the cited temperature range for a period of time sufficient to produce the product. Following the respective reaction, the product is recovered and isolated, if desired, from the reaction mixture following conventional techniques such as decantation, filtration, distillation, extraction, evaporation, and chromatography.

The given reactions consume the respective reactants in the ratio of one mole of starting compound per mole of halogenating agent and one mole of intermediate compound per mole of dehydrohalogenating agent. However, the amounts of the reactants to be employed are not critical, some of the desired product being obtained when employing any proportions thereof. In the preferred embodiments hereof, the appropriate reactants are employed in amounts ranging from about 0.9 mole to about 1.2 moles of the halogenating agent per mole of starting compound and amounts ranging from about 2 moles to, preferably, a large excess of dehydrohalogenating agent per mole of intermediate compound.

It is possible to obtain the 1,2-dihydrophenanthrene product from the halogenation step; that is, under the conditions of the reaction, dehydrohalogenation occurs to some extent without the necessity of promotion. However, in the preferred embodiments, which realize higher yields, the dehydrohalogenation step, as described, is performed on the 4-halo intermediate compound.

The process of the present invention can be practiced upon starting materials bearing the substituents defined by $R^1$, $R^2$, $R^3$, $R^4$, and $R^5$. In accordance with the ordinary level of skill in the art, certain of the substituents are introduced at a time subsequent to the principal reactions in order to avoid chemical interference or competition. For example, the carboxylic acid salts are prepared as a last step. In the preferred embodiments, the first, halogenation step is performed upon starting compounds in which $R^2$ is other than carboxy and hydroxymethyl. These groups can be introduced subsequently upon hydrolysis of the ester or ether.

The compounds represented by the formula:

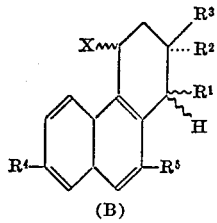

(B)

wherein each of $R^1$, $R^2$, $R^3$, $R^4$, $R^5$ and X is as hereinabove defined; are novel compounds of the present invention useful as intermediates, as herein set forth, in the preparation of the 1,2-dehydrophenanthrene products hereof.

The novel compounds of the present invention of the formula:

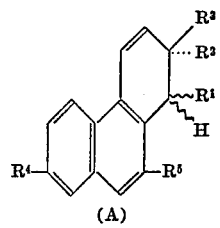

(A)

wherein $R^1$ is methyl or ethyl;
$R^2$ is carboxy and the alkali metal salts thereof, carb-(lower) alkyloxy, formyl, or hydroxymethyl and the conventional hydrolyzable esters and ethers thereof;
$R^3$ is methyl or ethyl;
$R^4$ is lower alkyloxy, hydroxy or the conventional hydrolyzable esters and ethers thereof; and
$R^5$ is hydrogen or methyl;

are prepared by the process comprising halogenating a compound of the partial Formula I

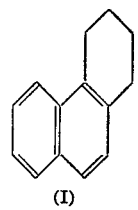

(I)

to prepare the corresponding compound of partial Formula II

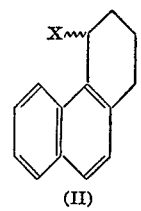

(II)

wherein X is bromo or chloro, and dehydrohalogenating the compound of the Formula II followed by, in optional order and to the extent desired or required:

(1) Cleaving any ester or ether group to the corresponding alcohol,
(2) Converting any carboxylic acid to the corresponding ester,
(3) Converting any carboxylic acid to the corresponding salt,
(4) Reducing any ester to the corresponding alcohol,
(5) Hydrolyzing any acid ester to the corresponding acid,
(6) Oxidizing any alcohol to the corresponding aldehyde,
(7) Oxidizing any aldehyde to the corresponding acid,
(8) Esterifying any hydroxyl group, and
(9) Etherifying any hydroxyl group.

The 1,2,3,4-tetrahydrophenanthrene starting compounds hereof are known in the art or can be prepared in accordance with known processes. See, for example, Helv. Chim. Acta. 28, 1506 (1945) and Helv. Chim. Acta. 30, 777 (1947) and U.S. patent application by Edwards Ser. No. 589,494, filed Oct. 26, 1966 for "Ethers Containing a Phenanthrene Nucleus", and the references cited in each, and Medicinal Chemistry, Volume II, John Wiley and Sons Inc., New York, 1956. Thus, for further example, preparation of the ethers of the hydroxymethyl compounds follows upon etherification with dihydropyran (for the tetrahydrofuran-2-yl ethers) and dihydrofuran (for the tetrahydrofuran-2-yl ethers) and 4-methoxy-5,6-dihydro-2H-pyran (for the 4-methoxytetrahydropyran-4-yloxy ethers) with acid catalyst in inert solvent. Cyclopentyl ethers are prepared upon reaction of the hydroxy compound with sodium hydride and cyclopentyl bromide. The corresponding esters are prepared by reacting the hydroxymethyl compound with a hydrocarbon carboxylic acid anhydride in the presence of pyridine.

The C–10 methyl starting compounds are prepared in accordance with the procedure described in U.S. patent application Ser. No. 638,648, filed May 15, 1967 by Edwards and Fried for Phenanthrene-2-Carboxylic Acids, which is hereby incorporated by reference. This method involves reacting a 2 - (3 - methyl - 1,2,3,4-tetrahydro naphthyliden)-ethyl isothiouronium acetate together with a tetronic acid in an aqueous organic solution at about room temperature to prepare the corresponding α-[2-(3-methyl - 1,2,3,4 - tetrahydronaphthyliden)-ethyl]-tetronic acid compound. This compound is then contacted with a strong acid optionally in an organic solvent at a temperature of from about room temperature to about reflux to prepare the corresponding 7 - methyl - 16 - oxaestra-1,3,5(10),8,14 - pentaen - 17 - one steroid. Dehydrogenation thereof with palladium catalyst forms the corresponding 6,7-dehydro derivative thereof or treatment of the steroid with an alkali metal hydroxide aqueous organic solution at about room temperature prepares the corresponding 1 - acetyl-10-methyl-1,2,3,4-tetrahydrophenanthrene-2-carboxylic acid alkali metal salt. This can be subjected to carbonyl reduction and thence converted to the acid ester with an alkyl iodide which can be converted to the free acid upon base hydrolysis.

Representative starting tetrahydrophenanthrane compounds are the following:

1β,2β-dimethyl-2α-carboxy-7-methoxy-1,2,3,4-tetrahydrophenanthrene,

1α-ethyl-2α-carbomethoxy-2β-methyl-7-ethoxy-10-methyl-1,2,3,4-tetrahydrophenanthrene.

1α-methyl-2α-hydroxymethyl-2β-ethyl-7-methoxy-1,2,3,4-tetrahydrophenanthrene

1β,2β-diethyl-2α-tetrahydropyran-2'-yloxymethyl-7-cyclopentyloxy-1,2,3,4-tetrahydrophenanthrene, 1β,2β,10-trimethyl-2α-carboxy-7-methoxy-1,2,3,4-tetrahydrophenanthrene, 1α-ethyl-2α-carboethoxy-2β-methyl-7-tetrahydropyran-2'-yloxy-1,2,3,4-tetrahydrophenanthrene, 1α,10-dimethyl-2α-hydroxymethyl-2β-ethyl-7-ethoxy-1,2,3,4-tetrahydrophenanthrene, 1α,2β-diethyl-2α-cyclopentyloxymethyl-7-tetrahydropyran-2'-yloxy-1,2,3,4-tetrahydrophenanthrene, 1β-methyl-2α-carboxy-2β-ethyl-7-n-propyloxy-1,2,3,4-tetrahydrophenanthrene, 1β-ethyl-2α-tetrahydropyran-2'-yloxymethyl-2β,10-dimethyl-7-tetrahydropyran-2'-yloxy-1,2,3,4-tetrahydrophenanthrene.

The following preparation and examples further illustrate the manner by which the present invention can be practiced and represent, in one aspect, the best mode for carrying out the invention. As such, however, they should be construed merely as illustrative and not as limitative upon the overall scope hereof.

PREPARATION 1

A solution of 1 g. of 3-methoxybenzoic acid in 50 ml. of benzene is treated with 2 g. of thionyl chloride. The mixture is heated at reflux under anhydrous conditions for two hours and then evaporated under reduced pressure. The residue is dissolved in 20 ml. of benzene and this solution is evaporated to dryness to yield 3-methoxybenzoyl chloride.

A solution of 1 g. of the latter compound in 50 ml. of anhydrous ether is heated to reflux and a solution of 5 g. of diethyl cadmium and 50 ml. of anhydrous ether is added. After being heated to reflux for 20 hours the mixture is extracted with ether. These extracts are washed with water to neutrality and evaporated to yield 3-methoxy propiophenone.

A mixture of 1 g. of the latter compound and 0.5 g. of glyoxylic acid in a solution of 0.5 g. of potassium hydroxide in 10 ml. of water and 10 ml. of ethanol is allowed to stand at room temperature for a period of 18 hours. The solid which forms is collected by filtration, washed with water and dried to yield 3-(3'-methoxybenzoyl)-2-butenoic acid.

A suspension of 0.5 g. of 5% palladium-on-charcoal catalyst in 50 ml. of methanol is hydrogenated for 30 minutes. A solution of 1 g. of the latter compound and 200 ml. of methanol is added and hydrogenated with agitation until the uptake of hydrogen has ceased. The catalyst is removed by filtration and the solution is evaporated to yield 3-(3'-methoxybenzoyl) butanoic acid.

A mixture of 1 g. of the latter compound, 2 g. of hydrazine hydrate, 1.2 g. of potassium hydroxide, 1.2 ml. of water and 1.2 ml. of diethylene glycol is heated for 45 minutes at reflux, then in an open flask until the temperature of the reaction mixture is 200° C., and finally for an additional two hours at reflux. The mixture is cooled, water added and the product isolated by extraction with ether. These extracts are dried over sodium sulfate and evaporated to yield 3-(3'-methoxybenzyl) butanoic acid.

A mixture of 1 g. of the latter material in 10 ml. of polyphosphoric acid is heated on a steam bath for a period of about 8 hours. The reaction mixture is then poured into ice water and the mixture is extracted several times with ether. The ether extracts are combined and evaporated to dryness to give 3-methyl-6-methoxy-1-tetralone.

A mixture of 1 g. of 3-methyl-6-methoxy-1-tetralone in 20 ml. of acetic acid is saturated with hydrogen bromide gas. The mixture is then allowed to stand for 24 hours and then the reaction mixture is concentrated. The thus-obtained residue, 25 ml. of 95% methanol and 0.5 g. of potassium hydroxide is refluxed for one hour. The reaction mixture is then poured into ice water and the solid which forms is collected by filtration, washed with water and dried to yield 3-methyl-6-hydroxy-1-tetralone.

A freshly prepared solution of 3 g. of vinyl bromide in 3 ml. of tetrahydrofuran is added to 0.5 g. of magnesium in 5 ml. of tetrahydrofuran to prepare a vinyl magnesium Grignard reagent. To this mixture is then added a soluton of 1 g. of 3-methyl-6-methoxy-1-tetralone in 25 ml. of tetrahydrofuran and 10 ml. of ether and the resulting mixture is held at room temperature for a period of 24 hours, then heated at reflux for one hour and then cooled. The reaction mixture is then poured into water, acidified with hydrochloric acid and stirred vigorously to decompose any excess Grignard reagent. The organic phase is then separated and the aqueous layer is extracted several times with ether. The combined ether extracts are washed with water to neutrality, dried over sodium sulfate and evaporated to dryness to yield the crude 3-methyl-6-methoxy-1-vinyl-1-tetralol.

A mixture of 11.8 g. of thiourea and 100 ml. of acetic acid is warmed on a steam bath until the mixture becomes homogeneous. The solution is then cooled to room temperature and to it is them added 32 g. of 3-methyl-6-methoxy-1-vinyl-1-tetralol. The resulting mixture is agitated until the mixture again becomes homogeneous. The acetic acid is then removed by heating (50–60° C.) under reduced pressure to afford a syrup. The syrup is poured with stirring into 70 ml. of ether. The resulting precipitate is collected and dried to yield 2-(3-methyl-6-methoxy-1,2,3,4 - tetrahydronaphthyliden) ethyl isothiouronium acetate which can be recrystallized from methanol:ether.

To a well-stirred solution of 16.8 g. of ethyl α-propionyl propionate in 100 ml. of anhydrous ether is added dropwise 17 g. of bromine at such a rate that the solution continually remains clear. After completion of the bromine addition, stirring is maintained for an additional two hours. At the end of the reaction time, the ether is evaporated under reduced pressure and the resulting oil is then dissolved in 65 ml. of xylene, and the resulting xylene mixture is refluxed for 17 hours. The xylene mixture is allowed to cool and then concentrated to a smaller volume and upon cooling deposited a precipitate of α,γ-dimethyl tetronic acid which is collected by filtration and recrystallized from benzene:hexane.

To a solution of 12.5 g. of 2-(3-methyl-6-methoxy-1,2,3,4 - tetrahydronaphthyliden)ethyl isothiouronium acetate in a mixture of 80 ml. of ethanol, and 100 ml. of water, is added a solution of 5.1 g. of α,γ-dimethyl tetronic acid in 20 ml. of ethanol. Immediately, the reaction mixture is diluted by adding an additional 80 ml. of water, stirred and allowed to stand at room temperature for a period of 16 hours. The reaction mixture is then cooled to 5° C. for two hours, and the thus-formed precipitate collected by filtration to yield α-[2-(3-methyl-6 - methoxy - 1,2,3,4-tetrahydronaphthyliden)-ethyl]-α,γ-dimethyl tetronic acid.

Nine grams of α-[2-(3-methyl-6-methoxy-1,2,3,4-tetrahydronaphthyliden)-ethyl]-α,γ-dimethyl tetronic acid and 460 mg. of p-toluenesulfonic acid in 120 ml. of benzene is heated at reflux for four hours, during which time water is continuously removed from the reaction mixture by a Dean-Stark trap. After cooling, the reaction mixture is filtered through a short column of silica gel and evaporated under reduced pressure to yield 3-methoxy-7,15 - dimethyl - 16 - oxaestra-1,3,5-(10),8,14-pentaen-17-one which is crystallized from ether.

A mixture of 0.5 g. of 3 - methoxy - 7,15 - dimethyl-16-oxaestra-1,3,5(10),8,14-pentaen-17-one and 5 mg. of 5% palladium-on-charcoal catalyst and 75 ml. of xylene is heated at reflux for 36 hours. The mixture is then cooled, filtered to remove the catalyst and the filtrate is evaporated under reduced pressure to yield a residue containing predominantly 3 - methoxy - 15-methyl-16-oxaestra-1,3,5(10),6,8,14 - hexaen - 17 - one and a small amount of 3 - methoxy-15-methyl-16-oxa-14β-estra-1,3,5(10),6,8-pentaen-17-one. The residue is purified by preparative thin layer chromatography and crystallized from methanol to yield 3 - methoxy - 7,15 - dimethyl - 16 - oxa-estra-1,3,5(10),6,8,14 - hexaen - 17 - one. 1,3,5(10),8,14-pentaen-17-one, 0.4 g. of maleic acid and 0.25 g. of 5% pallidium-on-charcoal catalyst and 75 ml. of benzene is heated at reflux for about 24 hours. The mixture is then cooled to room temperature and filtered. The filtrate is then washed with a dilute aqueous sodium bicarbonate solution, dried and evaporated to yield 3-methoxy-7,15-dimethyl - 16 - oxaestra - 1,3,5(10),6,8,14 - hexaen-17-one which is crystallized from methanol.

A mixture of 250 mg. of 3 - methoxy - 7,15-dimethyl-16 - oxaestra - 1,3,5(10),6,8,14 - hexaen - 17 - one in 25 ml. of absolute ethanol and 10 ml. of 1 N aqueous sodium hydroxide solution is allowed to stand at room temperature for 24 hours. The reaction mixture is then filtered and the thus-collected crystalline residue is washed with water and dried to yield the sodium salt of cis 7-methoxy-1-acetyl - 2,10 - dimethyl-1,2,3,4-tetrahydrophenanthrene-2-carboxylic acid.

A mixture of 307 mg. of the sodium salt of cis 7-methoxy - 1 - acetyl - 2,10 - dimethyl - 1,2,3,4 - tetrahydrophenanthrene - 2 - carboxylic acid, 1 ml. of methyl iodide and 7 ml. of dimethylacetamide is stirred in the dark for five hours. Then, excess methyl iodide is removed by evaporation under reduced pressure. The reaction mixture is then poured into water and the mixture extracted several times with ether. The ether extracts are combined, washed with water and then dilute aqueous sodium thiosulfate solution, dried and evaporated to furnish the methyl ester of cis 7-methoxy-1-acetyl-2,10-dimethyl-1,2,3,4 - tetrahydrophenanthrene - 2 - carboxylic acid which can be crystallized from benzene:hexane.

Into a cathode compartment of a divided electrolysis cell provided with a cellulose dialysis membrane, lead electrodes (each electrode measuring 2 cm. x 5 cm. x. 1.6 mm.) and a stirrer, there is added 20 mlg.of the methyl ester of cis 7-methoxy-1-acetyl-2,10-dimethyl-1,2,3,4-tetrahydrophenanthrene-2-carboxylic acid and a mixture of 15 ml. of dioxane and 15 ml. of 10% aqueous sulfuric acid (by weight). An additional amount of a mixture of 15 ml. of dioxane and 15 ml. of 10% aqueous sulfuric acid is added to the cell. A current density of 0.02 amps./cm.$^2$ is applied for a period of five hours. The reaction mixture is then removed from the cell and concentrated under reduced pressure to a small volume which is then extracted several times with ether. The ether extracts are combined, washed with water and a 5% aqueous sodium bicarbonate solution, dried and evaporated to dryness to furnish the methyl ester of cis 7-methoxy-1-ethyl-2,10-dimethyl-1,2,3,4-tetrahydrophenanthrene-2-carboxylic acid.

A mixture of 330 mg. of the methyl ester of cis 7-methoxy-1-ethyl-2,10-dimethyl - 1,2,3,4 - tetrahydrophenanthrene-2-carboxylic acid, 3.5 g. of potassium hydroxide, 7 ml. of ethanol and 7 ml. of water in a sealed tube is heated at about 180° C. for 45 minutes. The reaction mixture is allowed to cool and is then poured into water. The resulting mixture is then acidified by the addition of dilute aqueous hydrochloric acid and extracted several times with the ethyl acetate. The ethyl acetate extracts are combined, dried and evaporated to furnish cis 7-methoxy-1-ethyl-2,10-dimethyl - 1,2,3,4 - tetrahydrophenanthrene-2-carboxylic acid.

EXAMPLE 1

To a solution of 342 mg. of 1α-ethyl-2α-carbomethoxy-2β-methyl-7-ethoxy-10-methyl - 1,2,3,4 - tetrahydrophenanthrene in 30 ml. of carbon tetrachloride are added 184 mg. of finely powdered N-bromosuccinimide. The resulting mixture is heated to the boiling point and maintained at reflux with stirring while irradiating with a 200 watt incandescent lamp. After about 20 minutes, the mixture is cooled and the cooled mixture is filtered. The filtrate is evaporated under reduced pressure to provide a residue. The residue can be chromatographed on silica gel to provide 1α-ethyl-2α-carbomethoxy-2β-methyl-4-bromo-7-ethoxy-10-methyl-1,2,3,4-tetrahydrophenanthrene.

EXAMPLE 2

The residue from Example 1 is dissolved in 5 ml. of lutidine and heated with stirring at 80° C. for 5 minutes. After dilution of the cooled solution with ether, it is extracted several times with dilute aqueous hydrochloric acid. The organic layer is then washed successively with water, saturated aqueous sodium bicarbonate, and saturated saline solution, dried over magnesium sulfate, and evaporated under reduced pressure. Preparative thin layer chromatography (T.L.C.) of the residue affords 1α-ethyl-2α-carbomethoxy-2β-methyl-7-ethoxy - 10 - methyl-1,2-dihydrophenanthrene.

EXAMPLE 3

A solution of 1.56 g. of 1α-ethyl-2α-carbomethoxy-2β-methyl-7-methoxy-1,2,3,4-tetrahydrophenanthrene in 200 ml. of carbon tetrachloride is treated with 0.92 g. of N-bromosuccinimide, 2 drops of t-butyl hydroperoxide, and a trace of powdered cupric carbonate. The mixture is heated to reflux and irradiated for 15 minutes, at which time no unreacted N-bromosuccinimide remains. Workup as in Example 1 affords an oily residue of crude 1α-ethyl-2α-carbomethoxy - 2β - methyl-4-bromo-7-methoxy-1,2,3,4-tetrahydrophenanthrene.

EXAMPLE 4

The residue obtained in Example 3 is dissolved in 20 ml. of s-collidine and stirred at 60° C. for 10 minutes. Workup as in Example 2 affords a crude residue which is chromatographed on a silica gel column to furnish 1α-ethyl-2α-carbomethoxy-2β-methyl - 7 - methoxy-1,2-dihydrophenanthrene.

EXAMPLE 5

A mixture of 0.160 g. of 1α-ethyl-2α-carbomethoxy-2β-methyl-7-methoxy-1,2-dihydrophenanthrene and 0.300 g. of sodium hydroxide in 10 ml. of ethylene glycol is heated at reflux under a nitrogen atmosphere for 1 hour.

After cooling, the clear solution is acidified with dilute hydrochloric acid and extracted with ether. Extraction of the ethereal solution with aqueous sodium bicarbonate, followed by careful acidification of the aqueous layer, affords 1α - ethyl-2α-carboxy-2β-methyl-7-methoxy-1,2-dihydrophenanthrene.

EXAMPLE 6

In accordance with the above procedures, 1α-ethyl-2α-acetoxymethyl-2β-methyl-7-methoxy - 1,2 - dihydrophenanthrene is prepared from 1α-ethyl-2α-acetoxymethyl-2β-methyl - 7 - methoxy - 1,2,3,4 - tetrahydrophenanthrene through 1α-ethyl-2α-acetoxymethyl-2β-methyl-4-bromo-7-methoxy-1,2,3,4-tetrahydrophenanthrene.

One gram of 1α-ethyl-2α-acetoxymethyl-2β-methyl-7-methoxy-1,2-dihydrophenanthrene is allowed to stand at room temperature for 15 hours with 1 g. of potassium carbonate in 10 ml. of water and 90 ml. of methanol. At the end of this time, the methanol is evaporated under reduced pressure and the residue is extracted with ethyl acetate and water. Evaporation of the ethyl acetate from these extracts yields 1α-ethyl-2α-hydroxymethyl-2β-methyl-7-methoxy-1,2-dihydrophenanthrene.

EXAMPLE 7

The procedure of Example 1 is repeated employing, in lieu of N-bromosuccinimide, the reagents listed under Column A below to respectively prepare the compounds listed under Column B below.

(A)
N-chlorosuccinimide,
N-bromoacetamide,
N-chloroacetamide,
dibromodiphenylhydantoin, (B)
1α-ethyl-2α-carbomethoxy-2β-methyl-4-chloro-7-ethoxy-10-methyl-1,2,3,4-tetrahydrophenanthrene,
1α-ethyl-2α-carbomethoxy-2β-methyl-4-bromo-7-ethoxy-10-methyl-1,2,3,4-tetrahydrophenanthrene,
1α-ethyl-2α-carbomethoxy-2β-methyl-4-chloro-7-ethoxy-10-methyl-1,2,3,4-tetrahydrophenanthrene,
1α-ethyl-2α-carbomethoxy-2β-methyl-4-bromo-7-ethoxy-10-methyl-1,2,3,4-tetrahydrophenanthrene,

EXAMPLE 8

The procedure of Example 2 is repeated using the products of Example 7, Column B to prepare the 1α-ethyl-2α-carbomethoxy-2β-methyl-7-ethoxy - 10 - methyl - 1,2-dihydrophenanthrene in each instance.

EXAMPLE 9

The procedures of Examples 1 and 2 are repeated utilizing the starting compounds listed in Column C to respectively prepare the intermediates listed in Column D and products listed in Column E.

(C)
1α-ethyl-2α-carboxy-2β-methyl-7-methoxy-1,2,3,4-tetrahydrophenanthrene,
1α-ethyl-2α-carbomethoxy-2β-methyl-7-methoxy-1,2,3,4-tetrahydrophenanthrene,
1α-ethyl-2α-hydroxymethyl-2β-methyl-7-methoxy-1,2,3,4-tetrahydrophenanthrene.

(D)
1α-ethyl-2α-carboxy-2β-methyl-4-bromo-7-methoxy-1,2,3,4-tetrahydrophenanthrene,
1α-ethyl-2α-carbomethoxy-2β-methyl-4-bromo-7-methoxy1-, 2,3,4-tetrahydrophenanthrene,
1α-ethyl-2α-hydroxymethyl-2β-methyl-4-bromo-7-methoxy-1,2,3,4-tetrahydrophenanthrene.

(E)
1α-ethyl-2α-carboxy-2β-methyl-7-methoxy-1,2-dihydrophenanthrene,
1α-ethyl-2α-carbomethoxy-2β-methyl-7-methoxy-1,2-dihydrophenanthrene,
1α-ethyl-2α-hydroxymethyl-2β-methyl-7-methoxy-1,2-dihydrophenanthrene.

In like manner, the corresponding 4-chloro compounds otherwise corresponding to the intermediates of Column D are prepared upon practicing the methods of Example 7, using N-chlorosuccinimide and N-chloroacetamide, to prepare 1α-ethyl-2α-carbomethoxy-2β-methyl-4-chloro-7-methoxy-1,2,3,4-tetrahydrophenanthrene, and so forth. These are then converted to the products of Column E.

EXAMPLE 10

The procedure of Example 2 is repeated employing, in lieu of lutidine, the reagents listed under Column F below to prepare the 1α-ethyl-2α-carbomethoxy-2β-methyl - 7-ethoxy - 10 - methyl - 1,2 - dihydrophenanthrene in each instance.

(F)
collidine
pyridine
lithium chloride, N,N-dimethylformamide
t-butylamine

EXAMPLE 11

The procedure of Example 10 is repeated using the products of Example 7, Column B as starting materials to prepare 1α-ethyl-2α-carbomethoxy-2β-methyl - 7 - ethoxy-10-methyl-1,2-dihydrophenanthrene in each instance.

EXAMPLE 12

A mixture of 1 g. of 1α-ethyl-2α-hydroxymethyl-2β-methyl-7-methoxy-1,2-dihydrophenanthrene, 4 ml. of pyridine and 2 ml. of acetic anhydride is allowed to stand at room temperature for 15 hours. The mixture is then poured into ice water and the solid which forms is collected by filtration, washed with water and dried to yield 1α-ethyl-2α-acetoxymethyl-2β-methyl - 7 - methoxy-1,2-dihydrophenanthrene which may be further purified through recrystallization from acetone:hexane.

In like manner, the 2α-propionyloxymethyl, -butyroyloxymethyl, -caproyloxymethyl, and -trimethylacetoxymethyl compounds otherwise corresponding to the acetoxymethyl product of the foregoing paragraph are prepared by using the corresponding acylating agent. In like manner, the other acyloxymethyl compounds of the present invention are prepared by utilizing the corresponding acylating agent.

Two milliliters of dihydropyran are added to a solution of 1 g. of 1α-ethyl-2α-hydroxymethyl-2β-methyl-7-methoxy-1,2-dihydrophenanthrene in 15 ml. of benzene. About 1 ml. is removed by distillation to remove moisture and 0.4 g. of p-toluenesulfonyl chloride is added to the cooled solution. This mixture is allowed to stand at room temperature for four days, and is then washed with aqueous sodium carbonate solution and water, dried and evaporated. The residue is chromatographed on neutral alumina, eluting with hexane, to yield 1α-ethyl-2α-tetrahydropyran-2'-yloxymethyl-2β-methyl - 7 - methoxy-1,2-dihydrophenanthrene which is recrystallized from pentane.

By employing the method of the preceding paragraph using dihydrofuran in lieu of dihydropyran, there is prepared the corresponding 1α-ethyl-2α-tetrahydrofuran-2'-yloxymethyl-2β-methyl - 7 - methoxy - 1,2 - dihydrophenanthrene product. Similarly, the 1α-ethyl-2α-(4'-methoxytetrahydropyran-4'-yloxymethyl-2β-methyl - 7 - methoxy-1,2-dihydrophenanthrene product is prepared by utilization of the foregoing procedure employing 4-methoxy-5,6-dihydro-2H-pyran in lieu of dihydropyran.

A solution of one chemical equivalent of 1α-ethyl-2α-hydroxymethyl-2β-methyl-7-methoxy - 1,2 - dihydrophenanthrene in 30 ml. of benzene is heated to reflux and about 2 ml. removed by distillation to eliminate moisture. The mixture is cooled to room temperature and two chemical equivalents of sodium hydride are added, followed by the dropwise addition of two chemical equivalents of cyclopentyl bromide in 10 ml. of benzene over a period of 20 minutes. The mixture is allowed to reflux for 20 hours after which time the precipitate of sodium bromide is removed by filtration and the organic phase dried and evaporated to yield 1α-ethyl-2α-cyclopentyloxymethyl-2β-methyl-7-methoxy - 1,2 - dihydrophenanthrene which is further purified upon recrystallization from pentane.

Alternatively, the esters and ethers of 1α-ethyl-2α-hydroxymethyl-2β-methyl-7-methoxy - 1,2,3,4 - tetrahydrophenanthrene are prepared in accordance with this example and the resultant compounds are treated in accordance with the procedures of Examples 1 and 2 above to prepare the 2α-tetrahydropyran-2'-yloxymethyl, -tetrahydrofuran-2'-yloxymethyl, -4'-methyltetrahydropyran - 4'-yloxymethyl, and -cyclopentyloxymethyl compounds in the 1α-ethyl-2β-methyl-7-methoxy - 1,2 - dihydrophenanthrene series.

Similarly, the foregoing methods are used to prepare the corresponding C–7 esters and ethers of the 1,2-dihydrophenanthrene products hereof.

EXAMPLE 13

To a solution of 3 g. of 1α-ethyl-2α-carboxy-2β-methyl-7-methoxy-1,2-dihydrophenanthrene in 50 ml. of methylene chloride are added an excess of diazomethane in ether (obtained from nitrosomethylurea) and a few drops of methanol. The reaction mixture is maintained at room temperature for 18 hours and the excess reagent is then decomposed by the addition of acetic acid. The resulting mixture is poured into water and the organic layer is separated, washed with water to neutrality and evaporated to dryness to yield 1α-ethyl-2α-carbomethoxy-2β-methyl-7-methoxy-1,2-dihydrophenanthrene.

EXAMPLE 14

To a solution of 14.2 mg. of 1α-ethyl-2α-hydroxymethyl-2β-methyl-7-methoxy-1,2-dihydrophenanthrene in 150 mg. of dry dimethylsulfoxide is added a solution of 49.6 mg. of dicyclohexylcarbodiimide in 300 μl. of dimethylsulfoxide, followed by the addition of a solution of 2 μl. of trifluoro-acetic acid, 3.8 μl. of pyridine and 50 μl. of dimethylsulfoxide. After reaction, the mixture is partitioned between water and diethyl ether. The ether extracts are washed with water, dried and evaporated. The residue is subjected to thin-layer chromatography to obtain the 1α-ethyl-2α-formyl - 2β - methyl - 7-methoxy-1,2-dihydrophenanthrene product.

EXAMPLE 15

To a stirred solution of 1 g. of 1β-ethyl-2α-formyl-2β-methyl-7-cyclopentyloxy-1,2-dihydrophenanthrene in 10 ml. of acetone, cooled to 0° C., is added under nitrogen a solution of 8 N chromic acid (prepared by mixing 26 g. of chromium trioxide with 23 ml. of concentrated sulfuric acid and diluting with water to 100 ml.) until the color of the reagent persists in the mixture. The mixture is then stirred for 5 minutes at 0–5° C. and diluted with water. The solid which forms is collected by filtration, washed with water and dried under vacuum to yield 1β-ethyl-2α-carboxy-2β-methyl-7-cyclopentyloxy - 1,2 - dihydrophenanthrene which may be further purified by recrystallization from acetone:hexane.

EXAMPLE 16

To a solution of 10 g. of 1α-ethyl-2α-carboxy-2β,10-dimethyl-7-methoxy-1,2-dihydrophenanthrene in 200 ml. of ethanol is added the theoretical amount of potassium hydroxide dissolved in 200 ml. of 90% ethanol. The reaction mixture is then concentrated in vacuum giving potassium 1α-ethyl-2β,10 - dimethyl - 7 - methoxy-1,2-dihydrophenanthrene-2α-carboxylate.

In accordance with the foregoing methods, the following are prepared:

1α-methyl-2α-carboxy-2β-ethyl-7-methoxy-1,2-dihydrophenanthrene,
1β-ethyl-2α-carboethoxy-7-methoxy-10-methyl-1,2-dihydrophenanthrene,
1α-ethyl-2α-carbo-n-propoxy-2β-methyl-7-(4'-methoxytetrahydropyran-4'-yloxy)-1,2-dihydrophenanthrene,
1β-ethyl-2α-tetrahydropyran-2'-yloxy-2β-methyl-7-hydroxy-1,2-dihydrophenanthrene,
1α-methyl-2α-formyl-2β-ethyl-7-propionyloxy-1,2-dihydrophenanthrene,
sodium 1α-ethyl-2β-methyl-7-methoxy-1,2-dihydrophenanthrene-2α-carboxylate,
1β-ethyl-2α-carbo-n-butoxy-2β-ethyl-7-ethyl-7-hydroxy-1,2-dihydrophenanthrene,
1α,2β,10-trimethyl-2α-carboxy-7-hydroxy-1,2-dihydrophenanthrene,
1β,10-dimethyl-2α-pentanoyloxymethyl-2β-ethyl-7-cyclopentyloxy-1,2-dihydrophenanthrene,
1β,2β-diethyl-2α-cyclopentoyloxymethyl-7-acetoxy-1,2-dihydrophenanthrene,
potassium 1α-ethyl-2β-methyl-7-acetoxy-1,2-dihydrophenanthrene-2α-carboxylate,
1β-ethyl-2α-carboxy-2β-methyl-7-tetrahydropyran-2'-yloxy-1,2-dihydrophenanthrene,
1β-methyl-2α-formyl-2β-ethyl-7-ethoxy-1,2-dihydrophenanthrene,
1β-ethyl-2α-hydroxymethyl-2β-methyl-7-n-propoxy-1,2-dihydrophenanthrene,
1α-ethyl-2α-carbomethoxy-2β-methyl-7-n-propoxy-1,2-dihydrophenanthrene,
1β-methyl-2α-hydroxymethyl-2β-ethyl-7-isobutoxy-1,2-dihydrophenanthrene,
1β-methyl-2α-tetrahydrofuran-2'-yloxymethyl-2β-ethyl-7-isobutoxy-1,2-dihydrophenanthrene,
1β,2β-diethyl-2α-trifluoroacetoxymethyl-7-cyclohexyloxy-1,2-dihydrophenanthrene, and
1α,2β-diethyl-2α-acetoxymethyl-7-hydroxy-10-methyl-1,2-dihydrophenanthrene.

What is claimed is:
1. A compound selected from those represented by the following formula:

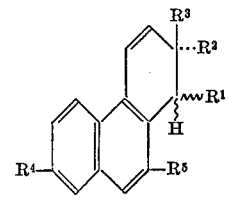

wherein
R¹ is methyl or ethyl;
R² is carboxy and the alkali metal salts thereof or carb-(lower)alkyloxy;
R³ is methyl or ethyl;
R⁴ is lower alkyloxy, hydroxy or a member of the conventional hydrolyzable esters and ethers selected from the group consisting of acetate, propionate, butyrate, trimethylacetate, valerate, methylethylacetate, caproate, t-butylacetate, 3-methylpentanoate, enanthate, caprylate, triethylacetate, pelargonate, decanoate, undecanoate, benzoate, phenylacetate, diphenylacetate, cyclopentylpropionate, methoxyacetate, aminoacetate, diethylaminoacetate, trichloroacetate, β-chloropropionate, bicyclo[2.2.2]octane-1-carboxylate, adamantoate, dihydrogen phosphate, dibenzyl phosphate, sodium ethyl phosphate, sodium sulfate, sulfate, tetrahydropyran-2-yl ether, tetrahydrofuran-2-yl ether, 4-methoxytetrahydropyran-4-yl ether, cyclopentyl ether; and
R⁵ is hydrogen or methyl.

2. A compound according to claim 1 wherein $R^1$ is ethyl; $R^3$ is methyl; and $R^4$ is lower alkyloxy.

3. A compound according to claim 2 wherein $R^5$ is hydrogen.

4. A compound according to claim 3 wherein $R^2$ is carboxy or carb(lower)alkyloxy.

5. The compound according to claim 4 wherein $R^2$ is carboxy and $R^4$ is methoxy which is 1α-ethyl-2α-carboxy-2β-methyl-7-methoxy-1,2-dihydrophenanthrene.

6. The compound according to claim 4 wherein $R^2$ is carbomethoxy and $R^4$ is methoxy which is 1α-ethyl-2α-carbomethoxy-2β - methyl - 7 - methoxy-1,2-dihydrophenanthrene.

References Cited

FOREIGN PATENTS 518,212   11/1955   Canada _____ 260—473 F

LORRAINE A. WEINBERGER, Primary Examiner

J. F. TERAPAVE, Assistant Examiner

U.S. Cl. X.R.

260—343.3, 343.6, 345.7, 345.8, 345.9, 347.3, 347.4, 347.8, 410.5, 457, 468 R, 468 B, 468.5, 476 C, 479 R, 479 S, 487, 488, 501.18, 514.5, 521 R, 590, 592, 600, 613 R, 613 D, 617.5, 941; 424—212, 283, 285, 299, 303, 305, 308, 311, 312, 317, 333, 346